No. 639,727. Patented Dec. 26, 1899.
P. M. HEERWAGEN.
REIN GUARD.
(Application filed Jan. 31, 1899.)
(No Model.)
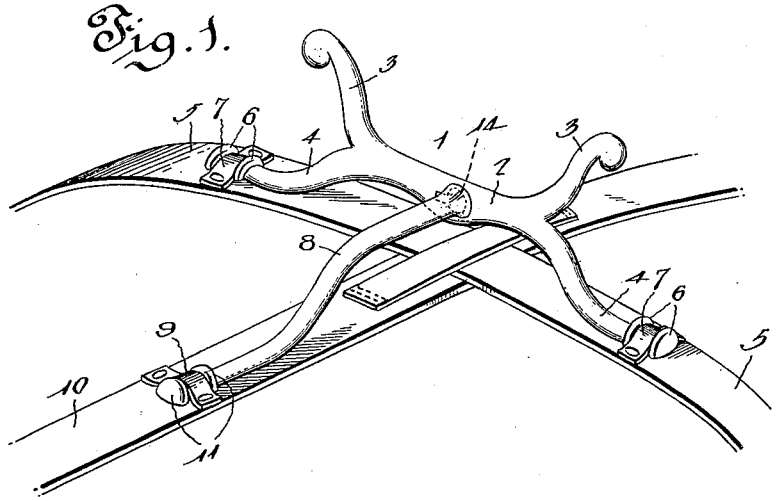
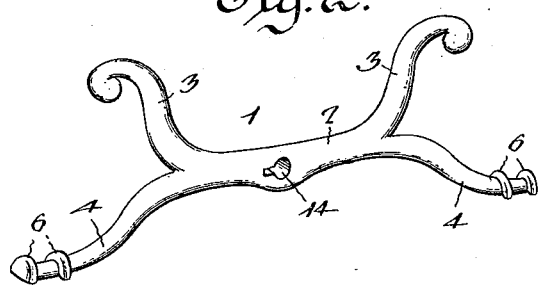
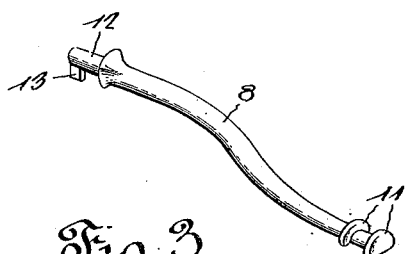
Witnesses Paul M. Heerwagen, Inventor.
By his Attorneys,
C. A. Snow & Co.

UNITED STATES PATENT OFFICE.

PAUL M. HEERWAGEN, OF LITTLE ROCK, ARKANSAS.

REIN-GUARD.

SPECIFICATION forming part of Letters Patent No. 639,727, dated December 26, 1899.

Application filed January 31, 1899. Serial No. 704,003. (No model.)

*To all whom it may concern:*

Be it known that I, PAUL M. HEERWAGEN, a citizen of the United States, residing at Little Rock, in the county of Pulaski and State of Arkansas, have invented a new and useful Rein-Holder, of which the following is a specification.

The invention relates to improvements in rein-holders.

The object of the present invention is to improve the construction of rein-holders and to provide a simple, inexpensive, and efficient device adapted to be readily mounted on a harness and capable of supporting the reins and of preventing the same from being entangled with the tail of a horse.

A further object of the invention is to provide a device which will also be adapted to receive and support the lines to prevent them from dragging along the ground and being stepped on by a horse while hitching or unhitching the latter.

The invention consists in the construction and novel combination and arrangement of parts hereinafter fully described, illustrated in the accompanying drawings, and pointed out in the claim hereto appended.

In the drawings, Figure 1 is a perspective view of a rein-holder constructed in accordance with this invention and shown applied to a harness. Fig. 2 is a detail perspective view, the brace being removed. Fig. 3 is a detail perspective view of the brace.

Like numerals of reference designate corresponding parts in all the figures of the drawings.

1 designates a rein-holder comprising a central substantially horizontal body portion 2 and upper and lower diverging arms 3 and 4, arranged in pairs and extending from the terminals of the central body portion 2, as clearly illustrated in Fig. 2 of the accompanying drawings. The lower arms or legs which support the body 2 straddle the crupper-strap and are secured at opposite sides thereof to the hip-straps 5, and the outer terminals of the lower arms 4 are provided with projecting lugs arranged in pairs and forming a recess or space between them. The lugs 6, which extend upward from the arm 4, are arranged at opposite sides of short securing-straps 7, which are riveted or otherwise secured to the hip-straps, whereby the rein-holder is secured to the same.

The upwardly-extending arms 3, which are preferably curved and present an ornamental appearance, as shown, form a rein-receiving recess or space between them and are adapted to support the lines a sufficient distance above the tail of the animal and at the same time maintain them close together to prevent any liability of the lines getting beneath the tail of the animal and obviating the inconvenience and discomfort resulting from the same. The upwardly-extending arms of the rein-holder form a rack and are adapted to receive the lines while hitching or unhitching a horse to prevent them from getting under the feet of the animal or dragging along the ground.

The rein-holder is supported by a forwardly-extending inclined brace 8, secured at its front end to the crupper-strap by means of a short securing-strap 9, riveted to the said crupper-strap 10 and arranged between a pair of lugs 11, constructed similar to the lugs 6, heretofore described. The rear or upper end of the brace abuts against the rein-holder and is detachably interlocked with the same by means of a short shank or stem 12, provided with a laterally-extending lug 13 and arranged in a keyhole slot or opening 14 of the rein-holder. The keyhole-slot 14, which is disposed horizontally, is located at the center of the rein-holder, and the short shank or stem 12, which is introduced into the opening 14, when the lug 13 is in a horizontal position, is rotated a quarter-turn to carry the lug away from the corresponding portion of the keyhole-slot, whereby the brace is rigidly secured to the holder.

The invention has the following advantages: The rein-holder, which is simple and comparatively inexpensive in construction, is strong and durable and presents an ornamental and attractive appearance and adds to the finish of a harness. It is detachably secured to a harness, and the parts, which are detachably interlocked to facilitate shipping and storing, are rigid with each other when assembled. The upwardly-extending arms form a rein-receiving space or recess and are adapted to support the reins or lines at a sufficient elevation to prevent them from getting under the tail of an animal, and the arms 3 also form a rack or support for the reins to prevent the same from dragging on the ground or being stepped on by a horse when hitching or unhitching.

Changes in the form, proportion, size, and the minor details of construction within the scope of the appended claim may be resorted to without departing from the spirit or sacrificing any of the advantages of this invention.

What is claimed is—

A device of the class described comprising upper and lower arms 3 and 4 arranged in pairs, the horizontal body portion connecting the inner ends of the upper and lower arms and having a keyhole-slot, the inclined brace having its upper end reduced to form a shoulder and arranged in the keyhole-slot and provided with a lug to form a detachable connection, and the lugs arranged in pairs at the ends of the lower arms and at the lower end of the brace and adapted to engage straps, whereby the device is mounted on a harness, substantially as described.

In testimony that I claim the foregoing as my own I have hereto affixed my signature in the presence of two witnesses.

PAUL M. HEERWAGEN.

Witnesses:
J. E. ENGLAND, Jr.,
P. W. CRAWFORD.